(12) United States Patent
Piehler

(10) Patent No.: US 7,517,094 B2
(45) Date of Patent: Apr. 14, 2009

(54) PROJECTION DEVICE

(75) Inventor: Eberhard Piehler, Lehesten (DE)

(73) Assignee: Carl Zeiss Jena GmbH, Jena (DE)

( * ) Notice: Subject to any disclaimer, the term of this patent is extended or adjusted under 35 U.S.C. 154(b) by 528 days.

(21) Appl. No.: 10/559,364

(22) PCT Filed: Feb. 27, 2004

(86) PCT No.: PCT/EP2004/001980

§ 371 (c)(1),
(2), (4) Date: Dec. 6, 2005

(87) PCT Pub. No.: WO2004/109365

PCT Pub. Date: Dec. 16, 2004

(65) Prior Publication Data

US 2006/0139581 A1   Jun. 29, 2006

(30) Foreign Application Priority Data

Jun. 6, 2003   (DE) ................. 103 25 867

(51) Int. Cl.
*G03B 21/14*   (2006.01)
(52) U.S. Cl. ............... 353/97; 353/99; 348/771
(58) Field of Classification Search ........... 353/98–101, 353/97, 122; 348/771; 359/663, 720, 726, 359/727, 733–736, 738–740, 799, 800
See application file for complete search history.

(56) References Cited

U.S. PATENT DOCUMENTS

| | | | | |
|---|---|---|---|---|
| 5,926,316 A | * | 7/1999 | Sugawara | 359/557 |
| 6,113,240 A | * | 9/2000 | Iizuka | 353/31 |
| 6,118,501 A | * | 9/2000 | Ohzawa | 349/5 |
| 6,129,437 A | * | 10/2000 | Koga et al. | 353/98 |
| 6,172,813 B1 | * | 1/2001 | Tadic-Galeb et al. | 359/618 |
| 6,315,415 B1 | * | 11/2001 | Hayashi et al. | 353/98 |
| 6,439,726 B1 | * | 8/2002 | Piehler | 353/98 |
| 6,784,946 B1 | * | 8/2004 | Schroter et al. | 348/771 |

(Continued)

FOREIGN PATENT DOCUMENTS

JP   10227906   8/1998

(Continued)

OTHER PUBLICATIONS

Yoshi Masumoto, "'Panasonic' New DLP Engine Eliminates TIR Prism," Panasonic MEI, [81] 6-6905-4387 (May 2003).

*Primary Examiner*—William C Dowling
(74) *Attorney, Agent, or Firm*—Price Heneveld Cooper Dewitt & Litton LLP

(57) ABSTRACT

In a projection device including a reflective light modulator for generating an image, a light source unit for illuminating the light modulator, and projection optics which include first and second partial optics, the projection optics have an optical axis. Each optical boundary surface of each lens of the first partial optics is curved and/or arranged such that, in a reference plane in which the optical axis of the projection optics is located and which is divided by the optical axis into upper and lower half-planes, each reflection ray bundle exiting the first partial optics proceeds completely either into the first or into the second half-plane. Thus, the invention prevents the reflection ray bundles from being projected onto the projection surface.

22 Claims, 4 Drawing Sheets

U.S. PATENT DOCUMENTS

| | | | |
|---|---|---|---|
| 7,204,613 B2 * | 4/2007 | Fushimi et al. | 362/268 |
| 2002/0057418 A1 * | 5/2002 | Wang | 353/53 |
| 2002/0093628 A1 | 7/2002 | Lewis et al. | |
| 2003/0107715 A1 | 6/2003 | Wang | |

FOREIGN PATENT DOCUMENTS

| | | |
|---|---|---|
| JP | 200258839 A | 9/2000 |

* cited by examiner

PROJECTION DEVICE

FIELD OF THE INVENTION

The present invention relates to a projection device comprising a reflective light modulator for generating an image, said light modulator comprising a plurality of independently controllable pixels, which are arranged in one image plane and can be respectively put in at least one of a first and a second state and which form an image-generating region, said projection device further comprising a light source unit for illuminating the pixels and comprising projection optics, which include first and second partial optics, said projection optics having an optical axis, wherein the light source unit, during operation of the projection device, emits an illumination ray bundle for illumination of the pixels, said illumination ray bundle passing through the first partial optics, which contain at least one lens, and then impinging on the pixels, wherein the light reflected by pixels in the first state passes, as a projection ray bundle for projection of the image onto a projection surface, through the first partial optics and then through the second partial optics, and wherein, upon passage of the illumination ray bundle through the first partial optics, a reflection ray bundle is generated at each optical boundary surface of each lens by the first partial optics, said reflection ray bundle propagating up to the second partial optics without further reflection at the optical boundary surfaces.

BACKGROUND OF THE INVENTION

In on-axis applications (e.g. central projection), such projection device is always disadvantageous insofar as at least part of each generated reflection ray bundle also passes through the second partial optics and is thus projected onto the projection surface. This causes the on-off contrast as well as the uniformity of the black image (wherein a planar black image is to be displayed) to deteriorate.

In order to prevent such reflection-related deterioration of the displayed image, the illumination light was previously directed onto the pixels by total internal reflection via a prism. However, such a prism is a relatively expensive component and requires an expensive anti-reflection coating. Further, the path in glass leads to undesirable chromatic aberrations.

In view thereof, it is an object of the invention to improve a projection device of the above-mentioned type such that the influence of illumination light reflections on the image quality of the projection is reduced.

SUMMARY OF THE INVENTION

According to the invention, the object is achieved by a projection device of the above-mentioned type, wherein each boundary surface of each lens of the first partial optics is curved and/or arranged such that, in a reference plane, in which the optical axis of the projection optics is located and which is divided by the optical axis into upper and lower half-planes, each reflection ray bundle exiting from the first partial optics passes completely either into the first or into the second half-plane, in order to prevent the reflection ray bundles from being projected onto the projection surface.

Since the reflection ray bundles thus bypass only one side of the second partial optics and no longer, as previously common in field lenses, both sides of the second partial optics, the influence of the reflection ray bundles on image projection can be reduced considerably. In particular, with a suitably adjusted curvature and/or a suitable arrangement, the reflection ray bundles can completely bypass the second partial optics. It is also possible that parts of the reflection ray bundle still enter the second partial optics, but due to their propagation direction, they do not pass completely through the second partial optics and, thus, do not reach the projection surface.

In this case, the reflection ray bundles are reflection ray bundles which are generated by a single reflection at one of the effective surfaces of the at least one lens of the first partial optics. Thus, these are first-order reflection ray bundles. Reflection ray bundles which are generated by multiple reflection at effective surfaces of the at least one lens of the first partial optics shall not be considered here.

If the projection optics do not have a common optical axis, then the optical axis of the projection optics is understood to be the optical axis of an element or of a lens, respectively, of the second partial optics, in particular the lens which is furthest away from the light modulator.

In particular, each optical boundary surface of each lens or field lens, respectively, of the first partial optics may be curved and/or arranged in such a manner that all reflection ray bundles exiting the first partial optics pass into the same (first or second) half-plane. This advantageously leads to a simplified construction of the projection optics. In particular, the light source unit is advantageously arranged such that, in the reference plane, the illumination ray bundle is directed onto the first partial optics from the other of said two half-planes (the second or first half-plane).

In a particularly preferred embodiment of the projection device according to the invention, the lenses of the first partial optics are provided and arranged such that the reflection ray bundles are respectively not coupled or only partially coupled into the second partial optics and are blocked out therein no later than the aperture stop of the projection optics. Thus, an excellent on-off contrast and a very uniform black image are achieved. In particular, the aperture stop may be located in a plane which is optically conjugated counter to the image plane or is located in that plane in which the surface is located in which those light beams of the different partial projection ray bundles (extending from different pixels) are collected which have the same angle (i.e. in the stop plane).

Further, in the projection device according to the invention, a deflecting element (such as a mirror, for example) for folding the beam path may be arranged in the projection optics. This allows the realization of very compact projection optics, which can be adapted to the corresponding external constructional conditions. In particular, for back projection, the projection optics can be adapted to predetermined constructional depths and heights of the back projection device. It is also possible, of course, to provide a deflecting element in the light source unit. Further, both the light source unit and the projection optics may be provided without a deflecting element. In the case of the beam path being folded in the projection optics, the corresponding areas of the half-planes are, of course, simultaneously transformed according to said folding. In other words, if the folded projection optics are looked at in an unfolded state, the division of the reference plane into the two half-planes is present again.

Further, in total, the first partial optics in the projection device according to the invention may have positive refractive power. This allows very good and uniform illumination of the light modulator to be achieved. In particular, the angle of aperture of the corresponding partial illumination ray bundle illuminating a pixel may be adapted to the requirements of the light modulator.

In a particularly preferred embodiment of the projection device according to the invention, the optical axis of the projection optics, when viewing the image-generating area from above, impinges on the image-generating area, preferably approximately in the middle. Thus, the projection device has a so-called on-axis structure. Therefore, it may also be provided as a central projection device, which is advantageous, in particular, when designing the projection device as a back projection device. Of course, the optical axis need not impinge on the image-generating area precisely in the middle. It is only essential that the optical axis impinge on the image-generating area approximately in the middle.

If the optical axis impinges on the image-generating area vertically, projection optics having particularly good imaging properties can be realized.

A particularly preferred embodiment of the projection device according to the invention consists in that the at least first lens of the first partial optics is offset in the reference plane transverse to the optical axis. This special arrangement of the at least first lens allows the desired reflection ray bundle path to be achieved in the simplest manner. The image-generating area may also be offset transverse to the optical axis, the offset of the image-generating area preferably being equal to the offset of the at least first lens.

It is also possible to tilt the at least first lens, in addition to the described offset or instead of said offset, by a first angle relative to the optical axis. This may also result in achieving the desired path of the reflection ray bundle.

Further, the image plane may also be tilted by a second angle relative to the optical axis, said two angles preferably being equal in amount, which is advantageous, in particular, for adjustment of the projection device.

According to a preferred embodiment of the projection device according to the invention, offset and/or tilting of at least one lens of the second partial optics is/are selected such that the imaging error of the projection optics caused by the offset and/or tilting of at least one lens of the first partial optics is compensated for at least in part. In addition to the offset and/or tilting of the at least one lens of the second partial optics or instead of said offset and/or of said tilting, at least one wedge and/or at least one tilted plane plate may be provided in the projection optics in order to at least partially compensate the imaging error of the projection optics caused by the offset and/or the tilting of at least one lens of the first partial optics. This allows to provide, in the simplest manner, projection optics having excellent imaging properties, while, at the same time, the reflected light properties are also considerably improved.

It is further possible that the first partial optics comprise at least two lenses which are offset and/or tilted relative to each other (and preferably also relative to the image-generating area) such that the imaging errors of the at least two lenses caused by the offset and/or tilting compensate each other at least in part. This embodiment comprising compensation already in the first partial optics may, of course, be combined also with the above-described compensation by suitable arrangement of lenses of the second partial optics.

Further, in the projection device according to the invention, the first lens may be a meniscus lens having positive refractive power, with the convex side of the meniscus lens facing the pixels. In this case, several meniscus lenses are preferably arranged in series, with the convex side of each lens respectively facing the pixels. Thus, the required positive refractive power can be distributed between several lenses, which allows the curvature of their effective surfaces to be reduced, which in turn allows the desired path of the reflected light beam to be achieved.

In this case, at least one of the meniscus lenses is advantageously made from a material having a refractive index of at least 1.7. This also has the effect that the radius of curvature of the corresponding lenses may be reduced, which makes it easy to achieve the desired path of the reflected light beam.

In an advantageous embodiment of the projection device according to the invention, a partial illumination ray bundle, by which a pixel is illuminated, and the corresponding partial projection ray bundle emitted by the pixel being in the first state cover a non-contiguous angular range in the reference plane. Thus, a greater degree of freedom in the design of the at least first lens is provided, which degree of freedom may be utilized in order to design the path of the reflected light beam as desired.

In particular, the light modulator may comprise a tilting mirror matrix, with the reference plane being perpendicular to the tilting axes of the tilting mirrors. The light modulator is preferably controlled by a control unit on the basis of predetermined image data. In doing so, black and white images or multicolor images may be generated; for multicolor image generation, the light modulator is repeatedly illuminated, for example, with different colors (e.g. red, green and blue) in a time sequence such that a viewer can perceive the partial color images, which have been projected one after the other, only as a superimposed multicolor image. Alternatively, it is also possible to provide several light modulators for the different partial color images, in which case a beam-splitter unit (e.g. a beam-splitter cube) may be provided between the first partial optics and the light modulators, said beam-splitter unit splitting up the illumination ray bundle, which has passed through the first partial optics, among the light modulators and combining the projection ray bundles, which come from the light modulators, into one common projection ray bundle, which it directs onto the first partial optics, such that a common projection ray bundle passes through the first and second partial optics. Of course, the beam-splitter unit may also be arranged such that it splits up the illumination ray bundle before the latter passes through the first partial optics, this embodiment providing first partial optics preceding each light modulator (i.e. between the corresponding light modulator and the beam-splitter unit), so that the projection ray bundles of the light modulators first pass through the associated first partial optics and are then combined to form the common projection ray bundle.

In a particularly preferred embodiment of the projection device according to the invention, said device is provided as a back projection device comprising a projection surface which is provided as a back projection screen. In particular, a so-called Fresnel lens may be arranged between the back projection screen and the projection optics. Also, one or more deflecting elements may be provided between the projection optics and the Fresnel lens or the projection surface, respectively, in order to provide a compact back projection device.

Further, in the projection device according to the invention, all lenses of the projection optics may be located on one common optical axis. This facilitates manufacture of the projection optics.

Also, the projection device according to the invention may be embodied such that it is provided as substantially centered and rotation-symmetrical optics, which are preferably substantially telecentric. This leads to projection optics having excellent imaging properties.

Particularly advantageously, the position of the second partial optics or of part thereof, respectively, is variable in the direction of the optical axis. This may be utilized in order to change the size of the projection. Thus, projection optics may be provided for use in manufacturing projection devices which display images having different sizes. This merely requires the second partial optics or part thereof, respectively, to be displaced in the direction of the optical axis and, then, to be fixed.

Further, the projection optics may comprise a shading stop in a stop plane which is conjugated counter to the image plane, said stop comprising a stop aperture having rotation symmetry. When tilting the image plane, the stop plane which is conjugated counter to the not yet tilted image plane is looked at in this case.

Also, in the projection device according to the invention, part of the stop aperture may be shaded by an additional stop element. This is particularly advantageous if a certain portion of the reflected light still passes through a limited part of the stop aperture. By means of the additional stop element, this reflected light portion can be shaded without loss of image information.

The invention will be explained in more detail below, by way of example and with reference to the drawings, wherein:

FIG. 1 shows a schematic representation of the projection device according to the invention;

FIG. 2 shows an enlarged view of a detail of the projection optics of the projection device according to FIG. 1;

FIG. 3 shows an enlarged view of a detail of the projection optics of the projection device according to FIG. 1;

FIG. 4 shows an enlarged view of a detail of the projection optics of the projection device according to FIG. 1, and FIGS. 5 to 10 show enlarged partial views of the projection optics of FIG. 1 according to a further embodiment.

As is evident from FIG. 1, which schematically shows a first embodiment of the projection device according to the invention, the projection device comprises a reflective light modulator 1, provided as a tilting mirror matrix here, which comprises a multiplicity of tilting mirrors arranged in lines and columns that can be independently switched back and forth between first and second tilted positions by means of a control unit 2, on the basis of predetermined image data. The tilting axes of the tilting mirrors are located in an image plane which is perpendicular to the drawing plane. Thus, the tilting mirrors are pixels forming an image-generating area of the light modulator.

Further, the projection device comprises a light source unit 3 for illuminating the tilting mirrors, said light source unit 3 comprising a light source 4 and imaging optics 5 (schematically shown) arranged following the light source 4. The projection device is further provided with projection optics 6, which comprise first partial optics 7 and second partial optics 8, again schematically represented, said two partial optics 7, 8 each containing at least one lens.

An illumination ray bundle 9, which passes through the first partial optics 7 and impinges on the light modulator 1, is generated by means of the light source unit 3 during operation of the projection device. The light reflected by the tilting mirrors being in the first tilted position (first state) forms a projection ray bundle 10, which in turn passes through the first partial optics 7 and then through the second partial optics 8 and thus impinges on a projection surface 11, in order to project thereon the image adjusted by means of the light modulator 1. The light reflected by the tilting mirrors being in the second state (second tilted position) is upwardly deflected (in the view according to FIG. 1) in an oblique manner (not shown) and is, therefore, not projected onto the projection surface 11 by means of the projection optics 6.

FIG. 2 shows an enlarged view of the projection optics 6 of FIG. 1 together with the light modulator 1 in more detail, so as to explain the suppression of reflected light, showing three partial illumination ray bundles B1, B2 and B3 of the illumination ray bundle 9 for three selected pixels P1, P2 and P3 in solid lines and the reflection ray bundle R1 (or three partial reflection ray bundles R11, R12, R13 thereof, respectively) generated at an optical boundary surface W1 of the first partial optics 7 in broken lines up to the second partial optics 8. The pixels P1 and P3 are one pixel each at the upper and lower edges of the light modulator 1, whereas the pixel P2 is located on the optical axis OA.

As is evident from the representation in FIG. 2, the second partial optics 8 comprise a first group of lenses 13, which is arranged following the first partial optics 7, as seen in the direction of projection, as well as a second group of lenses 14, arranged following the first group of lenses 13, with the optical axis OA of the second group of lenses 14 being shown here. The first group of lenses 13 is upwardly offset in the drawing plane transverse to the optical axis OA. As is further shown in FIG. 2, the light modulator 1 comprises a cover glass D and is tilted by about 30 relative to the optical axis OA. The first partial optics 7 consist of a first lens 15 having positive refractive power, said lens being downwardly offset relative to the optical axis OA, so that the first lens 15 is no longer arranged rotation-symmetrically to the optical axis OA. This advantageously has the effect that the reflection ray bundle R1 generated, at the boundary surface W1 of the first lens 15 turned away from the light modulator 1, by the illumination ray bundle 9 passing through the first lens 15, extends upwards in an oblique fashion (in FIG. 2). Thus, all rays of the reflection ray bundle R1 extend into the upper half-plane H1, which is located in the drawing plane and is separated from the lower half-plane H2 by the optical axis OA. As is evident from the ray paths as shown, the partial reflection ray bundle R11 bypasses the second partial optics 8, whereas the partial reflection ray bundles R12 and R13 impinge at least on the first lens of the first group of lenses 13. However, the angles of the partial reflection ray bundles R12, R13 are so steep that these beams do not pass through the stop 16 and are, thus, not projected onto the projection surface 11. This results directly from a comparison of the ray heights and angles of the partial reflection ray bundles R12 and R13 with the beam heights and beam angles of the partial projection ray bundles S1, S2, S3 of the pixels P1, P2 and P3, which are indicated in FIG. 3 by solid lines. FIG. 3 shows, in an illustration similar to that of FIG. 2, the three partial illumination ray bundles B1, B2 and B3 as well as the partial projection ray bundles S1, S2, S3 for the three pixels P1, P2, P3, with the pixels P1, P2 and P3 all being in the first tilted position.

In a manner similar to FIG. 2, FIG. 4 shows a reflection ray bundle R2, which is generated by reflection at the boundary surface W2 of the first lens 15, said boundary surface facing the light modulator 1. It is also evident from the representation in FIG. 4 that, due to the lens offset of the lens 15 transverse to the optical axis OA, the rays of the reflection ray bundle R2 either bypass the second partial optics 8 directly or do not pass through the stop 16 in the second partial optics 8, because the reflection ray bundle extends into the upper half-plane H1. Thus, since the reflection ray bundles of the first lens 15, which forms the first partial optics, extend into the upper half-plane H1 the reflections of the illumination ray bundle 9 are effectively prevented from being projected onto the projection surface 11, so that a good on-off contrast as well as good uniformity of the black image are achieved.

BRIEF DESCRIPTION OF THE DRAWINGS

Further, it is also clearly evident from FIG. 3 that the partial illumination ray bundle B1 and the corresponding partial projection ray bundle S1 (in the drawing plane) do not cover a contiguous angular range. This is advantageous insofar as, in the design of the first partial optics 7 (first lens 15), a further degree of freedom is thus given for optimizing the curvature and/or orientation of the boundary surfaces or effective surfaces W1 and W2, respectively, of the first lens 15. A further advantage of the described embodiment consists in that the first partial optics 7 comprise only one lens so that the projection device can be made small, compact and inexpensive.

DETAILED DESCRIPTION OF THE INVENTION

In particular, the projection device is also provided such that the second group of lenses 8 is positionally adjustable in the direction of the optical axis OA. This allows adjustment of a variable magnification factor. This may be advantageous, for example, in the manufacture of the projection device, because it allows to achieve different magnifications with one single projection optics, without having to change lenses or other optical elements. It is merely required to adjust the position in the direction of the optical axis OA of the second group of lenses 14.

Figure 2:
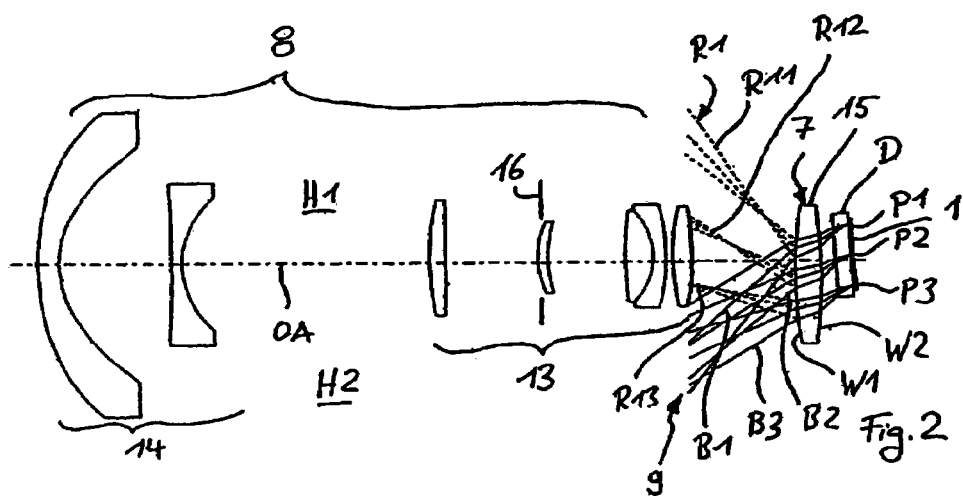
Figure 3:
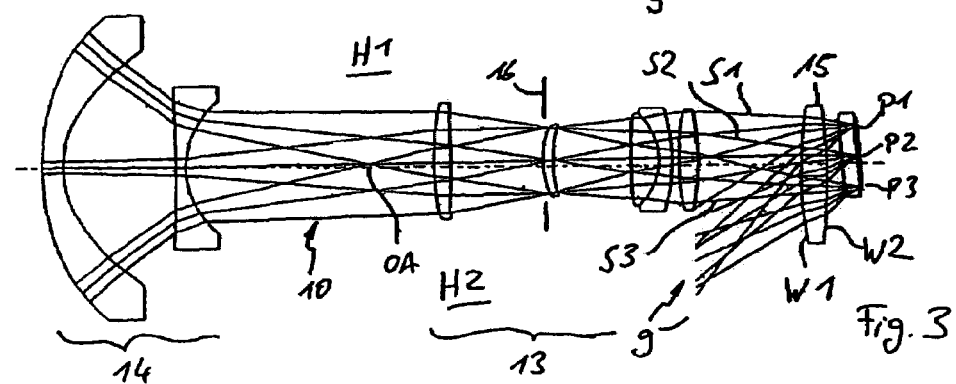
Figure 4:
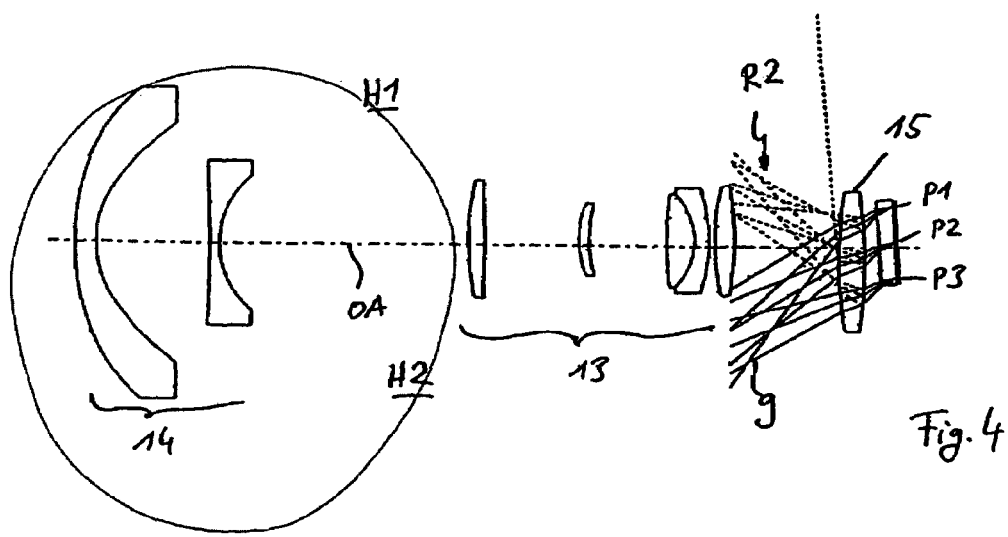

Similar to FIG. 2, the respective optical ray paths of a reflection ray bundle generated at one of the optical boundary surfaces W1 to W6 of the optical elements or lenses 17, 18, 19, respectively, of the first partial optics 7 are indicated, for a second embodiment of the projection device, by broken lines in FIGS. 5 to 10. Further, the illumination and projection ray bundles 9, 10 are indicated by solid lines. The second embodiment differs from the first embodiment essentially in that the first and second partial optics 7 and 8 are located on a common optical axis OA, in that the first partial optics 7 comprise three meniscus lenses 17, 18 and 19, whose convex side respectively faces the light modulator 1, and in that the optical axis OA vertically impinges on the image-generating area of the light modulator. The specific construction of the second partial optics 8 also differs somewhat as compared to the first embodiment. However, the second partial optics 8 comprise first and second groups of lenses 13 and 14 also in the presently described embodiment, with the second group of lenses 14 being positionally adjustable in the direction of the optical axis OA.

Figure 5:
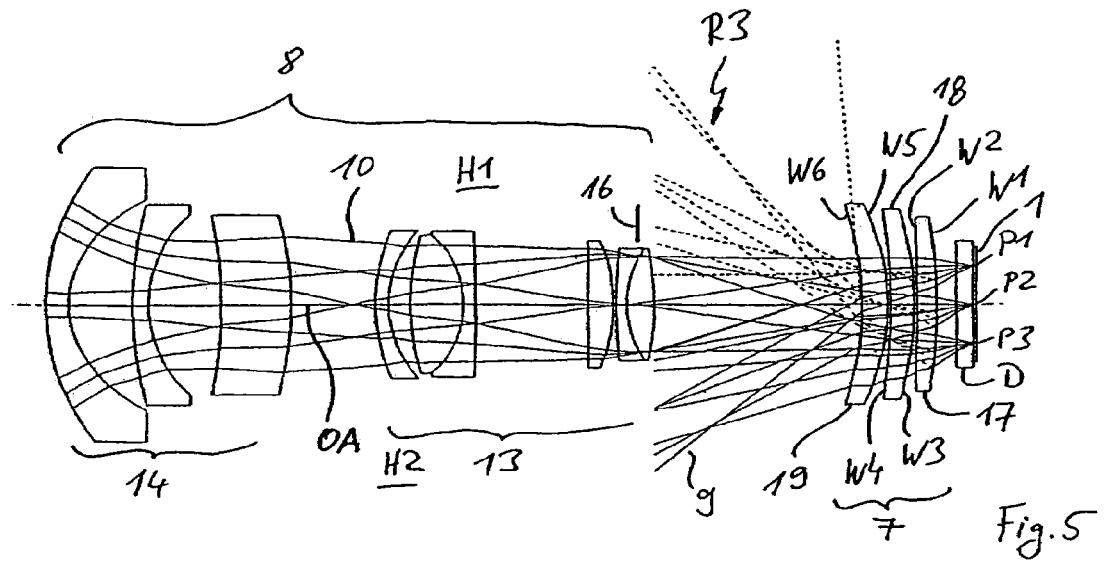
Figure 6:
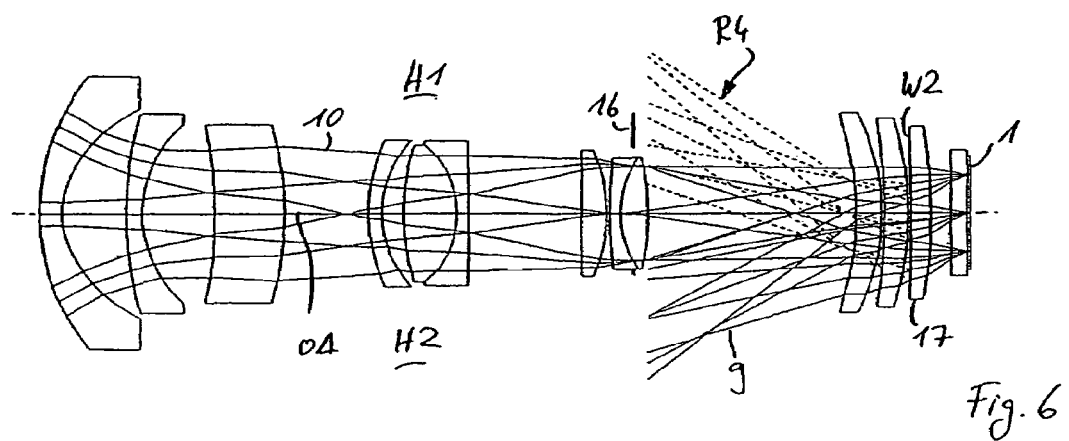
Figure 7:
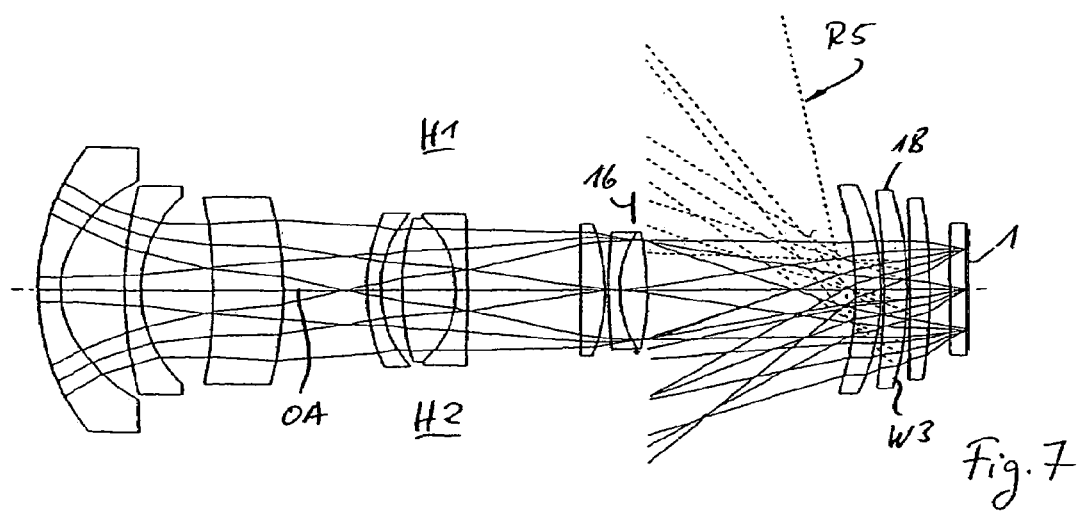
Figure 8:
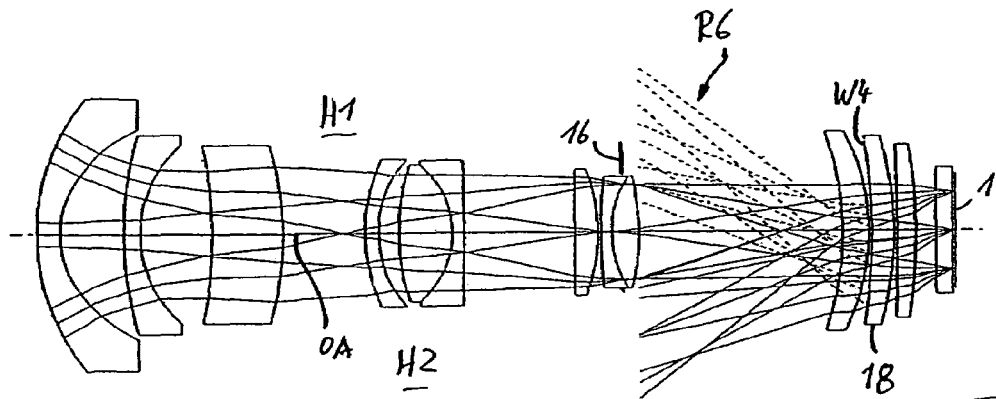
Figure 9:
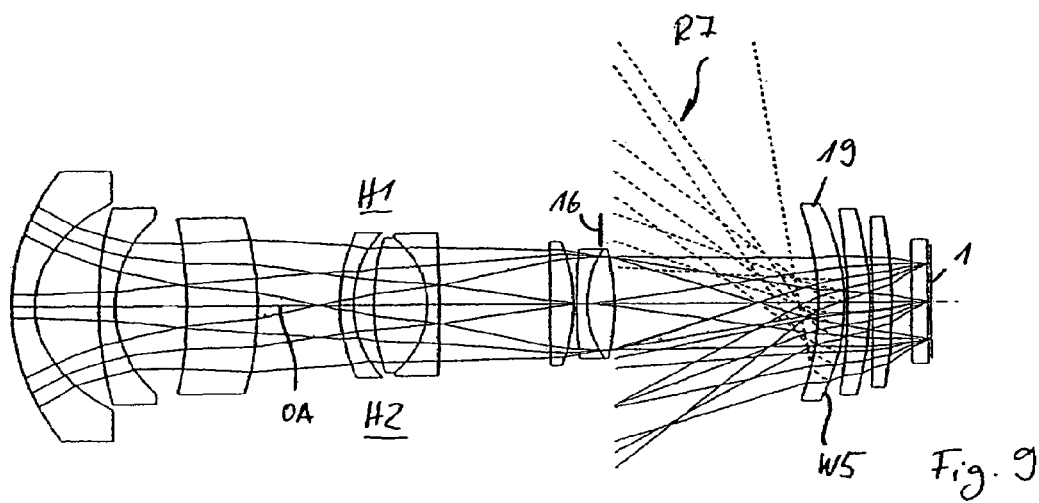
Figure 10:
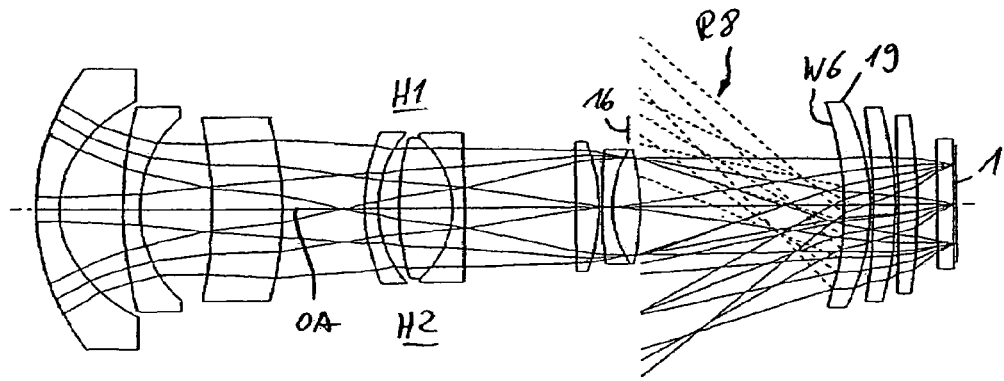

FIG. 5 shows reflection ray bundles R3, which are generated by reflection at the effective surface W1 of the first meniscus lens 17. In a similar manner, FIGS. 6 to 10 show the reflection ray bundles R4-R8, which are generated by reflection of the illumination ray bundle at the effective surfaces W2, W3, W4, W5 and W6. It is evident from the representations in FIGS. 5 to 10 that a major part of the reflection ray bundles bypass the second partial optics 8 and thus the stop 14 (which is arranged in the plane conjugated counter to the image plane). That part of the reflection ray bundles which still enters the second partial optics 8 leads to a certain reduction of the on-off contrast as well as of the uniformity of the black image here. However, it should be considered that, as a rule, only about 5% of the illumination ray bundle 9 is reflected at the effective surfaces W1-W6 and that, in the presently shown exemplary embodiment, no more than ⅕ thereof passes into the second partial optics 8. If this part of the reflected light is also not to be projected onto the projection surface 11, it is possible, for example, to provide an additional shading stop in the vicinity of the stop 14 through which the reflection ray bundles pass, or to correspondingly adjust (reduce) the aperture number of the projection optics such that the reflected light no longer passes through the second partial optics 8.

The invention claimed is:

1. A projection device comprising:

a reflective light modulator for generating an image, said light modulator comprising a plurality of independently controllable pixels which are arranged substantially in one image plane and can be respectively put in at least one of a first and a second state and which form an image-generating region;

a light source unit for illuminating the pixels;

projection optics including first and second partial optics, said projection optics having an optical axis; wherein the light source unit, during operation of the projection device, emits an illumination ray bundle for illumination of the pixels, said illumination ray bundle passing through the first partial optics, which contain at least a first lens, and then impinging on the pixels; and wherein the light reflected by the pixels being in the first state passes, as a projection ray bundle for projection of the image onto a projection surface, through the first partial optics and then through the second partial optics, and wherein, upon passage of the illumination ray bundle through the first partial optics, a respective reflection ray bundle is generated by the first partial optics at each optical boundary surface of each lens of the first partial optics, said reflection ray bundle propagating up to the second partial optics without further reflection at the optical boundary surfaces; and wherein each optical boundary surface of each lens of the first partial optics is offset and/or tilted in the reference plane relative to the optical axis such that, in a reference plane in which the optical axis of the projection optics is located and which is divided by the optical axis into upper and lower half-planes, each reflection ray bundle exiting the first partial optics proceeds completely either into the first or into the second half-plane, in order to prevent the reflection ray bundles from being projected onto the projection surface.

2. The projection device as claimed in claim 1, wherein each optical boundary surface of each lens is curved and/or arranged such that all reflection ray bundles exiting the first partial optics proceed into the same half-plane.

3. The projection device as claimed in claim 2, wherein the light source unit is arranged such that the illumination ray bundle in the reference plane is directed onto the first partial optics from the other of the two half-planes.

4. The projection device as claimed in claim 1, wherein the reflection ray bundles are respectively not coupled or only partially coupled into the second partial optics and are blocked out therein no later than an aperture stop of the projection optics.

5. The projection device as claimed in claim 1, wherein a deflecting element for folding the beam path is arranged in the projection optics.

6. The projection device as claimed in claim 1, wherein, in total, the first partial optics have positive refractive power.

7. The projection device as claimed in claim 1, wherein the optical axis of the projection optics, when viewing the image-generating area from above, intersects the image-generating region.

8. The projection device as claimed in claim 7, wherein the optical axis of the projection optics intersects the image-generating region approximately centrally.

9. The projection device as claimed in claim 7, wherein the optical axis intersects the image-generating region substantially orthogonally.

10. The projection device as claimed in claim 1, wherein the image plane is tilted by a second angle relative to the optical axis.

11. The projection device as claimed in claim 10, wherein said first and said second angles are substantially equal.

12. The projection device as claimed in claim 1, wherein imaging error of the projection optics caused by offset and/or tilting of the first lens is compensated for, at least in part, by at least one technique selected from a group consisting of tilting at least one lens of the second partial optics, utilizing at least one prism and utilizing at least one tilted plane plate.

13. The projection device as claimed in claim 1, wherein imaging error of the projection optics caused by offset and/or tilting of the first lens is compensated for, at least in part, by tilting at least one lens of the second partial optics and/or by at least one prism or at least one tilted plane plate.

14. The projection device as claimed in claim 10, wherein the imaging error of the projection optics caused by offset and/or tilting of the first lens is compensated for, at least in part, by at least one technique selected from a group consisting of tilting at least one lens of the second partial optics, utilizing at least one prism and utilizing at least one tilted plane plate.

15. The projection device as claimed in claim 1, wherein the first partial optics comprises at least two lenses, which are offset and/or tilted relative to each other such that imaging errors of the at least two lenses caused by said offset and/or tilting compensate each other at least in part.

16. The projection device as claimed in claim 1, wherein the first lens is a meniscus lens having positive refractive power, with a convex side of the meniscus lens facing the pixels.

17. The projection device as claimed in claim 1, wherein the first lens is made of a material having a refractive index of at least about 1.7.

18. The projection device as claimed in claim 1, wherein, in the reference plane, a partial illumination ray bundle, by which a pixel is illuminated, and a partial projection ray bundle, which comes from the pixel being in the first state, cover a non-contiguous angular range.

19. The projection device as claimed in claim 1, wherein the light modulator comprises a tilting mirror matrix and the reference plane is perpendicular to the tilting axes of the tilting mirrors.

20. The projection device as claimed in claim 1, wherein all lenses of the projection optics are located on a common optical axis.

21. The projection device as claimed in claim 1, wherein the projection optics comprise substantially centered and substantially rotation-symmetrical optics.

22. The projection device as claimed in claim 21, wherein the projection optics are substantially telecentric.

* * * * *

UNITED STATES PATENT AND TRADEMARK OFFICE
CERTIFICATE OF CORRECTION

Figure 1:
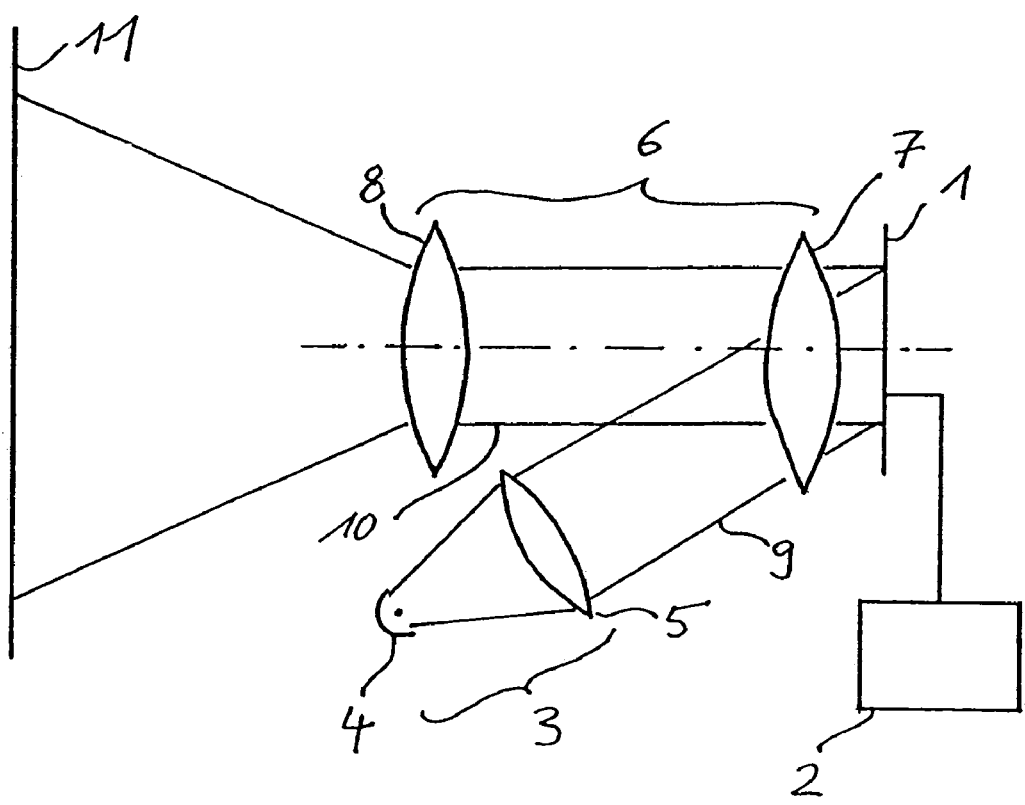

PATENT NO. : 7,517,094 B2
APPLICATION NO. : 10/559364
DATED : April 14, 2009
INVENTOR(S) : Piehler It is certified that error appears in the above-identified patent and that said Letters Patent is hereby corrected as shown below:

Col. 5, line 17,
insert --BRIEF DESCRIPTION OF THE DRAWINGS--;

Col. 5, line 26,
"FIG. 1," should be --FIG. 1;--;

Col. 5, line 29,
insert --DETAILED DESCRIPTION OF THE INVENTION--;

Col. 6, line 17,
"about 30 relative" should be --about 3° relative--;

Col. 6, line 40,
"pixels P1, P2 and P3," should be --pixels P1, P2, P3--;

Col. 6, lines 42-43,
"bundles B1, B2 and B3" should be --bundles B1, B2, B3--;

Col. 6, lines 44-45,
"pixels P1, P2 and P3" should be --pixels P1, P2, P3--;

Col. 6, line 57,
"half-plane H1 the" should be --half--plane H1, the--;

Col. 6, line 62,
delete "BRIEF DESCRIPTION OF THE DRAWINGS";

Col. 7, line 8,
delete "DETAILED DESCRIPTION OF THE INVENTION";

UNITED STATES PATENT AND TRADEMARK OFFICE
CERTIFICATE OF CORRECTION

PATENT NO.       : 7,517,094 B2
APPLICATION NO.  : 10/559364
DATED            : April 14, 2009
INVENTOR(S)      : Piehler It is certified that error appears in the above-identified patent and that said Letters Patent is hereby corrected as shown below:

Col. 7, line 31,
    "lenses 17, 18 and 19" should be --lenses 17, 18, 19--.

Signed and Sealed this

Twenty-eighth Day of July, 2009

JOHN DOLL
*Acting Director of the United States Patent and Trademark Office*